US011244567B2

(12) United States Patent
Civitella

(10) Patent No.: US 11,244,567 B2
(45) Date of Patent: Feb. 8, 2022

(54) METHOD OF DETERMINING IF AN OBJECT IS ALLOWED TO BOARD OR DISEMBARK A VEHICLE AT A VEHICLE STOP

(71) Applicant: Transfinder Corporation, Schenectady, NY (US)

(72) Inventor: Antonio Civitella, Schenectady, NY (US)

(73) Assignee: TRANSFINDER CORPORATION, Schenectady, NY (US)

( * ) Notice: Subject to any disclaimer, the term of this patent is extended or adjusted under 35 U.S.C. 154(b) by 0 days.

(21) Appl. No.: 17/182,548

(22) Filed: Feb. 23, 2021

(65) Prior Publication Data
US 2021/0272458 A1 Sep. 2, 2021

Related U.S. Application Data

(60) Provisional application No. 62/982,461, filed on Feb. 27, 2020.

(51) Int. Cl.
*G08G 1/13* (2006.01)
*G08G 1/133* (2006.01)
*G06K 9/00* (2006.01)
*G08G 1/00* (2006.01)

(52) U.S. Cl.
CPC ......... *G08G 1/133* (2013.01); *G06K 9/00201* (2013.01); *G06K 9/00832* (2013.01); *G08G 1/207* (2013.01)

(58) Field of Classification Search
CPC ........ G08G 1/133; G08G 1/207; G08G 1/005; G06K 9/00201; G06K 9/00832; G09B 21/006
See application file for complete search history.

(56) References Cited

U.S. PATENT DOCUMENTS

| 9,965,819 | B1 | 5/2018 | DeVries | |
| 2015/0369621 | A1 | 12/2015 | Abhyanker | |
| 2017/0254646 | A1* | 9/2017 | Lee | H04W 4/024 |
| 2018/0164809 | A1 | 6/2018 | Moosaei et al. | |
| 2018/0238694 | A1* | 8/2018 | Bellotti | G01C 21/3423 |
| 2019/0265703 | A1 | 8/2019 | Hicok et al. | |

OTHER PUBLICATIONS

International Search Report and Written Opinion of the International Searching Authority for International Application No. PCT/US2021/019159 dated May 19, 2021.

* cited by examiner

*Primary Examiner* — Joseph H Feild
*Assistant Examiner* — Sharmin Akhter
(74) *Attorney, Agent, or Firm* — Heslin, Rothenberg, Farley & Mesiti, P.C.

(57) ABSTRACT

A method of determining if an object is allowed to board or disembark a vehicle. The method includes determining an object to be a candidate for boarding or disembarking a vehicle at a vehicle stop along a vehicle route. An assignment status is automatically assigned, via a processor, to the object representing whether the object is allowed to board or disembark the vehicle at the stop. The assignment status is based on attributes associated with the object, the street and the stop. The attributes are predetermined and stored in at least one memory storage device. The assigned assignment status is communicated to an operator. Based on the assigned assignment status, the vehicle is designated to stop for the object to board or disembark the vehicle at the stop.

20 Claims, 9 Drawing Sheets

FIG. 4 (Ref. 400)

FIG. 5 (Ref. 500)

FIG. 6  (Ref. 600)

| SYMBOL | DESCRIPTION | REF. NO. |
|---|---|---|
| | PROCESSORS OR SERVERS | 702 |
| | DATA OR INFORMATION SUCH AS AN ELECTRONIC MAP | 704 |
| | PROCESS OR ALGORITHM | 706 |
| | CLOUD COMPUTING | 708 |
| | END USERS OR OPERATORS | 710 |
| | RESULTS SUCH AS A BUS ROUTE WITH ASSIGNED BUS STOPS | 712 |
| | USER INTERFACES | 714 |

FIG. 8

METHOD OF DETERMINING IF AN OBJECT IS ALLOWED TO BOARD OR DISEMBARK A VEHICLE AT A VEHICLE STOP

CROSS REFERENCE TO RELATED APPLICATION

This patent application perfects and claims priority benefit to U.S. Provisional Patent Application No. 62/982,461, filed Feb. 27, 2020, and entitled METHOD OF DETERMINING IF AN OBJECT IS ALLOWED TO BOARD OR DISEMBARK A VEHICLE AT A VEHICLE STOP, which is hereby incorporated herein by reference in its entirety.

BACKGROUND

Objects that are part of a planned or unplanned pickup and delivery schedule, that is used by a vehicle traversing a vehicle route, may be required to cross one or more streets in order to board or disembark a vehicle at a vehicle stop. One such example would be a plurality of students that are scheduled to board or disembark a bus at a bus stop on their way to or from a school.

However, a numerous variety of attributes associated with the object, the street and/or the stop, may require that the object be restricted or prohibited from crossing the streets before boarding or after disembarking from the vehicle. For example, a student may be at such a young age or may have a handicap that would make crossing any street a significant risk. Alternatively, a street, such as a superhighway, may be too busy for any object to cross it at any time.

In the specific example of students boarding or disembarking a bus, certain prior art methods have generally restricted students from crossing a street or intersection by grade levels, wherein such restrictions have generally been applied to an entire population of students in that grade level. However, such generalized restrictions do not take into consideration attributes unique to the individual students. Nor do such general restrictions take into consideration attributes specific to the various stops or streets that are not associated with the students.

Accordingly, there is a need for a method of determining if an object is allowed to board or disembark a vehicle that can take into consideration attributes associated with individual objects, rather than just general classes of objects. Additionally, there is a need for such a method that is based on attributes that are associated with the object, the stops and the streets that an object may be required to cross in order to board or disembark a vehicle.

BRIEF DESCRIPTION

Shortcomings of the prior art are overcome, and additional advantages are provided through the provision of a method, computer system and/or computer program product for determining if an object is allowed to board or disembark a vehicle at a vehicle stop. The object may be one or more students and the vehicle may be a bus on a bus route that stops at several stops that the students may be assigned (either manually or automatically) to in order to board or disembark the bus as the students travel to and from a school. The object could also be any other person using a public transportation vehicle. Additionally, but without limitation, the object may be a package or other cargo that is required to be picked up by or unloaded from a vehicle as it is shipped to a final destination.

In one example, a method is presented, in accordance with one or more aspects of the present disclosure, of determining if an object is allowed to board or disembark a vehicle at a vehicle stop. The method includes determining an object to be a candidate for boarding or disembarking a vehicle at a stop for the vehicle along a vehicle route based on a relative location of the object to the stop. An assignment status is automatically assigned, via a processor, to the object representing whether the object is allowed to board or disembark the vehicle at the stop. The assignment status is based on attributes associated with the object, a street and the stop. The attributes are predetermined and stored in at least one memory storage device. The assigned assignment status is communicated to an operator. Based on the assigned assignment status, the vehicle is designated to stop, and the operator allows the vehicle to stop for the object to board or disembark the vehicle at the stop.

In another example, a computer system is presented, in accordance with one or more aspects of the present disclosure, for determining if an object is allowed to board or disembark a vehicle at a stop. The computer system includes a memory; and a processor. The processor is in communication with the memory. The computer system is configured to perform a method. The method includes determining an object to be a candidate for boarding or disembarking a vehicle at a stop for the vehicle along a vehicle route based on a relative location of the object to the stop. An assignment status is automatically assigned, via a processor, to the object representing whether the object is allowed to board or disembark the vehicle at the stop. The assignment status is based on attributes associated with the object, the street and the stop. The attributes are predetermined and stored in at least one memory storage device. The assigned assignment status is communicated to an operator. Based on the assigned assignment status, the vehicle is allowed to stop for the object to board or disembark the vehicle at the stop.

In another example, a computer program product is presented, in accordance with one or more aspects of the present disclosure, for determining if an object is allowed to board or disembark a vehicle at a vehicle stop. The program product includes at least one computer readable storage medium readable by a processing circuit and storage instructions for performing a method. The method includes determining an object to be a candidate for boarding or disembarking a vehicle at a stop for the vehicle along a vehicle route based on a relative location of the object to the stop. An assignment status is automatically assigned, via a processor, to the object representing whether the object is allowed to board or disembark the vehicle at the stop. The assignment status is based on attributes associated with the object, the street and the stop. The attributes are predetermined and stored in at least one memory storage device. The assigned assignment status is communicated to an operator. Based on the assigned assignment status, the vehicle is allowed to stop for the object to board or disembark the vehicle at the stop.

It should be appreciated that all combinations of the foregoing concepts and additional concepts discussed in greater detail below (provided such concepts are not mutually inconsistent) are contemplated as being part of the inventive subject matter disclosed herein and may be used to achieve the benefits and advantages described herein.

DRAWINGS

The disclosure will be more fully understood from the following detailed description taken in conjunction with the accompanying drawings, in which:

FIG. 8, depicts the components of the system shown in FIG. 7; and

DETAILED DESCRIPTION

Certain examples will now be described to provide an overall understanding of the principles of the structure, function, manufacture, and use of the methods, systems, and devices disclosed herein. One or more examples are illustrated in the accompanying drawings. Those skilled in the art will understand that the methods, systems, and devices specifically described herein and illustrated in the accompanying drawings are non-limiting examples and that the scope of the present disclosure is defined solely by the claims. The features illustrated or described in connection with one example may be combined with the features of other examples. Such modifications and variations are intended to be included within the scope of the present disclosure.

The terms "substantially", "approximately", "about", "relatively," or other such similar terms that may be used throughout this disclosure, including the claims, are used to describe and account for small fluctuations, such as due to variations in processing from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Figure 1:
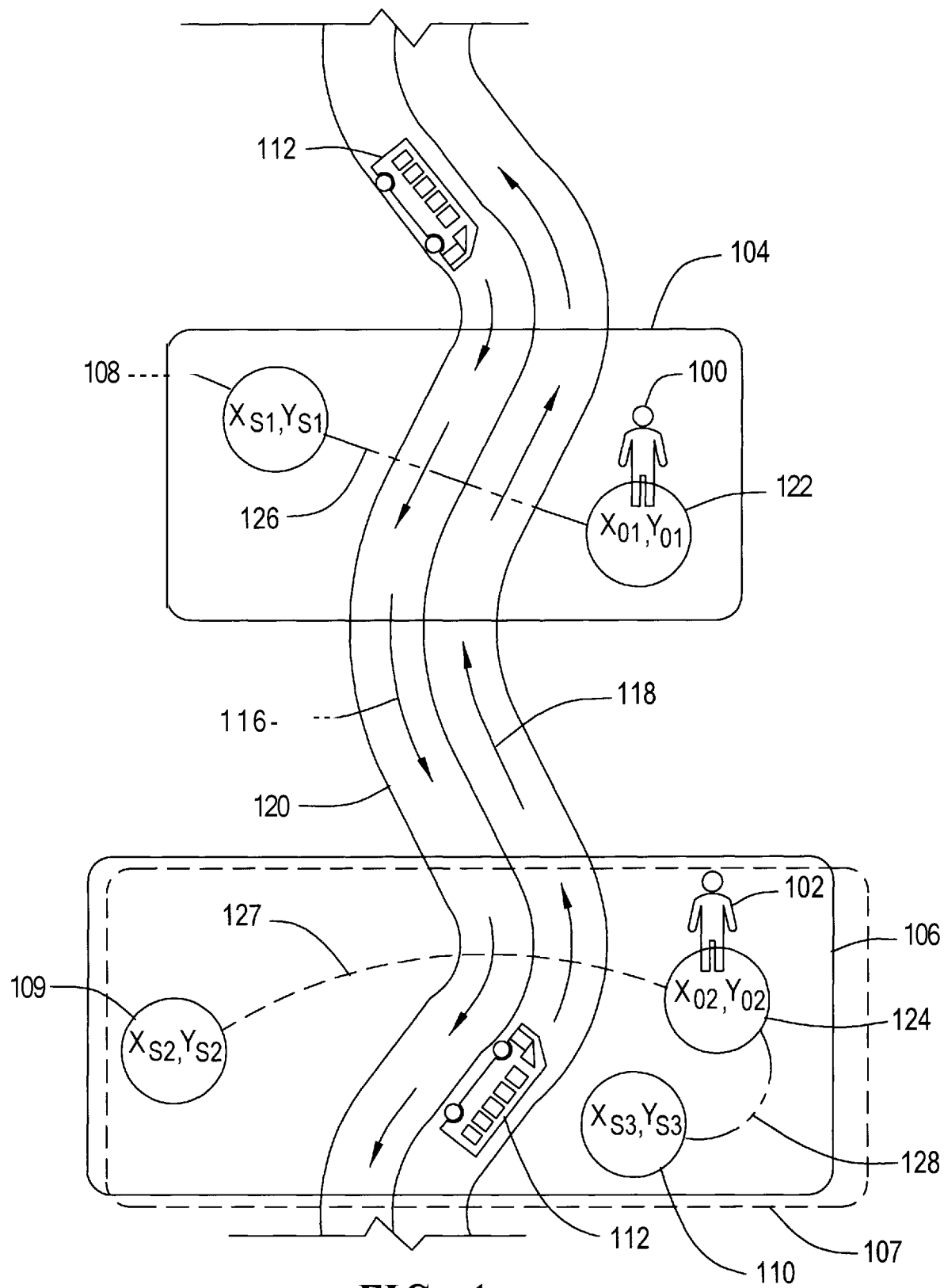
FIG. 1 depicts an example of a first student waiting within first boundaries of a first bus stop, and a second student waiting within second and third boundaries of second and third bus stops respectively, for an approaching bus, in accordance with aspects described herein.

Referring to FIG. 1, an example of a first student 100 and a second student 102 who are candidates for boarding or disembarking a bus 112, by virtue of the first student 100 being located within a first boundary 104 of a first bus stop 108, and the second student 102 being located within second and third boundaries 106, 107 of possible second and third bus stops 109 and 110 respectively, is depicted in accordance with aspects described herein. The bus 112 is designated to travel on bus routes, represented by route directional arrows 116, 118.

Objects, such as cargo including, for example, packages, animals, students or other people, that are part of a planned or unplanned pickup and delivery schedule that is used by a vehicle traversing a vehicle route may be candidates which may be required to cross one or more streets in order to board or disembark a vehicle at a vehicle stop. FIG. 1 illustrates one such example of such candidate objects, in this case the students 100, 102, that are located within or otherwise associated with first, second and third boundaries 104, 106, 107 to board (or disembark) bus 112 at potential bus stops 108, 109, 110 on the students' way to, or from, a school. The student may, for example, live within the boundary area. Also, the student's original or final destination may be located within the boundary areas.

In the example illustrated in FIG. 1, stop locations 108, 109, 110 have a one to one association with stop boundaries 104, 106, 107 respectively. That is, one stop location (for example stop 109) may only have one stop boundary (for example 106) associated with it. While boundaries may be stacked and may cover the same area, they may be associated with a single stop. For example, stop 109 may be associated only with boundary 106 and stop 110 may be associated only with boundary 107.

The bus routes 116, 118 may both traverse the same street 120 in opposite directions 116, 118. Bus 112 travels on the right-hand side of the street 120 relative to the respective direction of travel 116, 118. Accordingly, the bus stops 108, 109, 110 are each positioned on the right-hand side the street 120 relative to the directions of travel 116, 118 of the bus 112. The location of the first potential bus stop 108 is defined by stop coordinates Xs1, Ys1, the location of the second potential bus stop 109 is defined by stop coordinates Xs2, Ys2 and the location of the third potential bus stop 110 is defined by stop coordinates Xs3, Ys3. The first student 100 is positioned at an initial location 122 within a predefined stop boundary 104 of the first bus stop 108, wherein the initial location 122 is defined by object coordinates Xo1, Yo1. The second student 102 is positioned at an initial location 124 within a predefined stop boundary 106 associated with the second bus stop 109 and another predefined stop boundary associated with the third bus stop 110, wherein the initial location 124 is defined by object coordinates Xo2, Yo2.

The first student 100 is a candidate for the first potential bus stop 108 by virtue of the first student's initial location 122 being within the boundary 104 of the first bus stop 108. The second student 102 is a candidate for the second and third bus stops 109, 110 by virtue of the second student's initial location 124 being within the boundary 106, which is associated with the second bus stop 109, and within the boundary 107, which is associated with the third bus stop 110.

The first student 100 must traverse an object route 126 that crosses the street 120 in order to board the bus 112 at potential stop 108, because the first student's initial location 122 is positioned on the left hand side of the street 120 relative to the bus's direction of travel 116. However, due to various attributes of the student, street or stop, that will be discussed in greater detail herein, the first student 100 may or may not be restricted from crossing street 120 and boarding the bus 112 at bus stop 108. Therefore, if the attributes of the student, street and stop do not dictate preventing the student from crossing, the first student 100 may be designated as assignable to bus stop 108 and thereafter may be assigned (either automatically or manually) to bus stop 108, wherein the bus 112 would be authorized (or allowed) to stop at bus stop 108 in order to allow the first student to cross street 120 and board bus 112 at bus stop 108.

The second student 102 must traverse an object route 127 that crosses the street 120 in order to board the bus 112 at potential stop 109, because, much like the first student 100, the second student's initial location 124 is also positioned on the left hand side of the street 120 relative to the bus's direction of travel 116. However, like the first student 100, various attributes of the student, street or stop, may or may not restrict the second student from crossing street 120. Therefore, if the attributes of the student, street or stop dictate preventing the student from crossing, the second student 102 may not be assignable to bus stop 109 and may not be assigned to bus stop 109, wherein the bus 112 would not be allowed to stop at bus stop 109 in order to restrict the second student from crossing street 120 and boarding bus 112 at bus stop 109.

Conversely, the second student 102 may traverse an object route 128 that does not require crossing street 120 in order to board the bus 112 at potential stop 110, because the second student's initial location 124 may be on the right hand side of the street 120 relative to the bus's second direction of travel 118. Therefore, even though the second student 102 may be restricted from crossing the street 120, the second student may not be restricted from boarding the bus 112 at bus stop 110. Accordingly, the second student 102 may be designated as assignable to bus stop 110 and may thereafter be assigned to bus stop 110, wherein the bus 112 would be authorized to stop at bus stop 110 in order to allow the second student board bus 112 at bus stop 110.

A numerous variety of attributes associated with the students 100, 102, the street 120 and/or the stops 108, 109, 110, may require that the students be prohibited from crossing the street 120 before boarding or after disembarking from the bus 112. For example, a student may be at such a young age or may have a handicap that would make crossing any street a significant risk. Alternatively, a street, such as a superhighway, may be too busy for any object to cross it at any time. Additionally, an intersection where the stop is located may have excessive traffic, so the stop may be designated a non-crossing stop, wherein a student may not be allowed to cross any streets to get to the stop. Further, weather conditions, time of day, traffic patterns and other variable attributes may significantly change the risk to students crossing a street.

Prior art methods of determining whether a particular student, out of a population of students, should be allowed or restricted from crossing a street have been generally limited to restrictions based on grade levels that are applied to an entire population of students in each grade level. However, such generalized restrictions do not take into consideration attributes unique to the individual students. Nor do such general restrictions take into consideration attributes specific to the various stops and/or streets that may, or may not, be associated with the route a student must travel (herein referred to as an "object route") and cross a street in order to board or after disembarking a bus.

Additionally, such generalized prior art methods are prone to errors. For example, some students in a certain grade level may be capable of crossing a street without significant risk to the student's safety, whereas other students in the same grade level, due to for example a handicap, may not be.

The present invention includes technical and other improvements over prior art methods of determining if an object (such as a student) is allowed to board or disembark a vehicle (such as a bus), by taking into consideration attributes associated with individual objects (such as a student's age and physical health), rather than just general classes of objects (such as all students in a specific grade level). Additionally, such improved methods are based on attributes that are associated with the object, the stops and the streets that an object would be required to cross in order to board or disembark a vehicle. Such methods may significantly reduce risks to students compared to prior art methods. Moreover compared to prior art methods, such improved methods may avoid unnecessary delays in boarding or disembarking a vehicle due to certain students being assigned to bus stops that are not properly suited to the student's particular attributes, the attributes of the particular stop or the attributes of the street.

In the example illustrated in FIG. 1, the first student 100 may be deemed capable of crossing streets at least because of his age, grade level and physical condition. Additionally, the street 120 may be deemed crossable in general due to traffic patterns and crossable intersections on that street 120. Moreover, the first stop 108 may be deemed crossable by virtue of, among other things, the stop having a crossable intersection. As such, the first student 100 may be designated as assignable and thereafter assigned to the bus stop 108 of the bus 112, even though the first student's object route 126 would require that the student 100 cross the street 120 to board the bus 112, because the combined attributes associated with the stop 108, the student 100 and the street 120 do not restrict such crossing.

In contrast, the second student 102 may be deemed incapable of crossing streets in general because of a handicap. Additionally, even though the street 120 may be deemed crossable in general, the second and third stops 109, 110 may not be deemed crossable due to, for example, a dangerous intersection or no crossable intersections being located at the stops 109, 110. However, the second student 102 may be designated as assignable, and thereafter assigned to the third bus stop 110 of bus 112 even though the third bus stop is designated as non-crossable, because the second student's object route 128 would not require that the student 102 cross any streets to board the bus 112 at stop 110.

One such example of a method of determining if an object (such as a student, a package, a pet or the like) is allowed to cross a street to board or after disembarking a vehicle at a vehicle stop, according to aspects described herein, can described follows. The method includes determining an object (e.g., students 100, 102) to be a candidate for boarding or disembarking a vehicle (e.g., bus 112) at a stop (e.g., bus stops 108, 109, 110) for the vehicle along a vehicle route (e.g., bus routes 116, 118) based on a relative location of the object to the stop. An example of an object being determined to be a candidate based on relative location of the object to the stop would be the object having an initial or final location within a stop boundary of the stop.

Once an object is determined to be a candidate for a stop, an assignment status is automatically assigned, via a processor, to the object (e.g., students 100, 102) representing whether the object is allowed to board or disembark the vehicle (e.g., bus 112) at the stop (e.g., bus stops 108, 109, 110).

The assignment status of an object (such as a student) may have one of three designations: candidate, assignable or assigned. If the assignment status of an object retains the designation of "candidate", it means that the location coordinates for the object fall within the defined stop boundaries, but not all other criteria to potentially be assigned to a bus stop have been met and, therefore, the object is not assignable to the stop for pick-up or drop-off. If the assignment status of an object is designated as "assignable," it means that the object meets all of the required criteria to be assigned to the stop the object is a candidate for, but the object has not yet been actually assigned. If the assignment status of an object is designated as "assigned," it means that the object is assigned to the stop the object is a candidate for and is authorized to board or disembark the vehicle at that stop. Even if an object/student meets all the criteria and is "assignable", and is automatically designated as such by a processor, they may not be automatically assigned to that stop. The method allows a user to choose to make the assigning step automatic or manual, and users can choose not to assign an "assignable" object to the stop. If the method is setup to automatically assign, users may choose to override this option and un-assign the object.

In other words, in the examples illustrated herein, an object is a candidate for a stop by virtue of having object coordinates within a stop boundary of the stop. If object cross status, street cross status and stop cross status allow, the object's assignment status is automatically designated from candidate to assignable. Once an object is determined to be assignable, the object is eligible to be assigned to the stop. Going from an assignment status of assignable to assigned may be done manually or automatically. However, an assignable object does not have to be assigned and an object that is assigned may be unassigned.

As will be explained in greater detail herein, the assignment status of an object may be determined from the combination of an object's cross status (e.g., whether the object may be allowed to cross any street), a street's cross status (e.g., whether any objects may be allowed to cross that street) and a stop's cross status (e.g., whether any object may be allowed to cross any street to reach the stop). The object cross status, street cross status and stop cross status are each based on attributes associated with the object (e.g., students 100, 102), the street (e.g., street 120) and the stop (e.g., bus stops 108, 109, 110), respectively. The cross status for any object, street or stop is determined independently of any other object, street or stop. That is the method of determining a cross status for an object takes into account the object and only its associated attributes, but not the attributes of the object or stop. The method of determining a cross status for a street takes into account the street and only its associated attributes, but not the attributes of the object or stop. The method of determining a cross status for a stop takes into account the stop and only its associated attributes, but not the attributes of the object or street. A street or a stop may be designated as non-crossable due to its attributes, regardless of whether the street or stop is a part of the object route the object traverses or not.

The attributes are predetermined and stored in at least one memory storage device. The assigned assignment status is communicated to an operator or user. Based on the assigned assignment status, the operator allows the vehicle to stop for the object to board or disembark the vehicle at the stop.

Though the above described method has been illustrated with reference to students assigned to bus stops in FIG. 1, the method may be applied to any object that may be required to cross a street to board or after disembarking any vehicle. For example, the object may be a package or other cargo, a pet or a person other than a student. The vehicle may be a limousine, a train, a pick-up truck or any public transportation vehicle.

Figure 2:
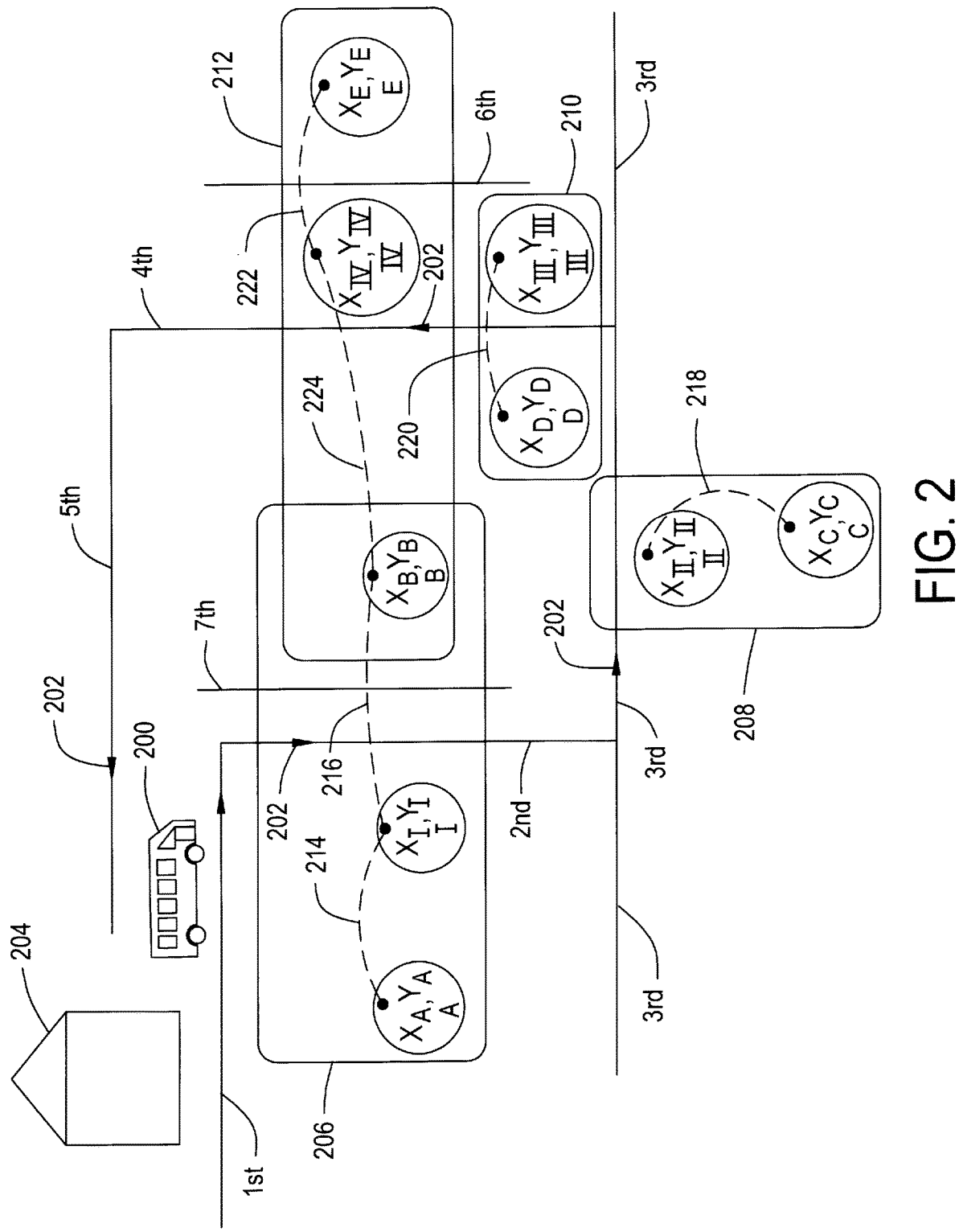
FIG. 2 depicts an example of a bus traversing a bus route, wherein the bus route takes the bus over a plurality of streets and wherein the streets have a plurality of bus stops associated with them, in accordance with aspects described herein.

Referring to FIG. 2, an example of a bus 200 traversing a bus route (as indicated by directional arrows 202), wherein the bus route 202 takes the bus 200 over a plurality of potential streets (1st, 2nd, 3rd, 4th and 5th streets) and wherein the streets have a plurality of bus stops (I, II, III and IV) associated with them, is depicted. A plurality of students (A, B, C, D and E) are candidates to be assigned to the bus stops, where they are allowed to board the bus 200 on their way to a school 204 or disembark from the bus 200 on their way home from the school 204.

A method, in accordance with present invention, is utilized by an operator to determine which students (A, B, C, D and E) are assignable and thereafter assigned to which bus stops (I, II, III, and IV). The operator may allow, or authorize, the bus to stop for a student only at their assigned bus stops in order to allow the student to board or disembark from the bus.

The method includes determining if a student (A, B, C, D, E) is a candidate for boarding or disembarking the bus 200 at a particular bus stop (I, II, III, IV) along the bus route 202, based on a relative location of the student to the bus stop (e.g., based on whether the student has an initial or final location within the stop boundary of the bus stop). Once a student is determined to be a stop candidate for a bus stop, a processor automatically assigns an assignment status (e.g., assignable or not assignable) to the student representing whether the student qualifies to be allowed to board or disembark the bus at that particular bus stop. The assignment status may be based on attributes associated with the student, streets the student may have to cross to board or disembark the bus and the bus stop itself. The attributes are predetermined and stored in at least one memory storage device that is associated with the processor. The assignable or not-assignable assignment status for a student object is communicated to the operator. Based on the assigned assignment status, for example if the assignment status is designated as assignable, the operator may then designate the student as assigned to a particular bus stop and authorize the bus 200 to stop for the student at that bus stop, in order for the student to board or disembark from the bus 200. Alternatively, a processor may designate the student object status as assigned automatically to candidate student objects assignable to the stop in which case the bus 200 is authorized to stop for the student at that bus stop, in order for the student to board or disembark from the bus 200.

One example of determining if a student (A, B, C, D, E) is candidate to the bus 200 includes obtaining stop coordinates representing a location of the bus stop (I, II, III, IV) for the bus 200 along a street (1st, 2nd, 3rd, 4th and 5th) of the bus route 202. Stop boundaries (206, 208, 210 and 212), surrounding the stop coordinates, are then obtained by the operator. A user interface (see FIG. 3) associated with the processor enables an operator to adjust the stop boundary of any bus stop to take into consideration such variable attributes as traffic patterns, or time of day.

Object coordinates for each student are obtained. The object coordinates may represent either an initial location (such as the student's home) of the student prior to boarding the bus 200, or a final location of the student after disembarking the bus. If the object coordinates are within the stop boundary of a particular bus stop, the student may be designated a candidate for that bus stop.

For the particular example illustrated in FIG. 2, bus stop I has stop coordinates $X_I$, $Y_I$ and has a stop boundary 206 associated with it. Both student A (with object coordinates $X_A$, $Y_A$) and student B (with object coordinates $X_B$, $Y_B$) fall within the stop boundary 206 and, therefore are designated as candidates for bus stop I.

Also, in FIG. 2, bus stop II has stop coordinates $X_{II}$, $Y_{II}$ and has a stop boundary 208 associated with it. Student C (with object coordinates $X_C$, $Y_C$) falls within the stop boundary 208 and, therefore is designated as a candidate for bus stop II.

Also, in FIG. 2, bus stop III has stop coordinates $X_{III}$, $Y_{III}$ and has a stop boundary 210 associated with it. Student D (with object coordinates $X_D$, $Y_D$) falls within the stop boundary 210 and, therefore is designated as a candidate for bus stop III.

Also, in FIG. 2, bus stop IV has stop coordinates $X_{IV}$, $Y_{IV}$ and has a stop boundary 212 associated with it. Both student E (with object coordinates $X_E$, $Y_E$) and student B (which has previously been designated a candidate for bus stop I) fall within the stop boundary 212 and, therefore are designated as candidates for bus stop IV.

Once a student has been designated a candidate for a bus stop, an object route (214, 216, 218, 220, 222 and 224) is determined (for example by the processor) for the student to traverse between the object coordinates and the stop coordinates. The object route may additionally include boarding or disembarking the bus. The object route may, or may not, include a street (such as 1st, 2nd, 3rd, 4th or 5th street) that is on the bus (or vehicle) route 202. The object route may include a plurality of streets to be crossed on the object route, some of which (such as 6th and 7th streets) may not be a street on the vehicle route 202. Also, a plurality of object routes may be determined for a particular student to traverse in order to travel between the student's object coordinates and the bus stop coordinates. Once an object route is determined for a student, and prior to assigning an assignment status to the student, it may be determined whether the student is required to cross any streets on the object route to board or after disembarking the bus at the bus stop.

Besides an object route (214, 216, 218, 220, 222 and 224) including a path for the student to traverse between the object coordinates and the stop coordinates, the object route may additionally include an extension of the object route for boarding or disembarking the bus. An example of such an object route extension would be where the stop coordinates and the actual boarding location of the bus 200 are on opposite sides of the street on the vehicle route 202. In that exemplary embodiment, the student would have to cross the street on the vehicle route in order to traverse from the stop coordinates to the actual boarding location of the bus 200. However, the student may not be allowed to cross the street if the street is designated as non-crossable, the stop is designated as non-crossable or the student is prohibited from crossing the street (i.e., is designated as a non-crosser).

For the particular example illustrated in FIG. 2, student A may traverse object route 214 to reach bus stop I. Object route 214 does not require student A to cross any streets in order to board or disembark bus 200, including 2nd street, which is the street on the vehicle route 202 that bus stop I is located along side.

Also, in FIG. 2, student B may traverse object route 216 to reach bus stop I and/or traverse object route 224 to reach bus stop IV, since student B is a candidate for both bus stops I and IV. Object route 216 requires student B to cross 7th street and 2nd street, in order to board or disembark bus 200 at bus stop I. Object route 224 requires student B to cross 4th street, in order to board or disembark bus 200 at bus stop IV.

Also, in FIG. 2, student C may traverse object route 218 to reach bus stop II. Object route 218 does not require student C to cross any streets in order to board or disembark bus 200, including 3rd street, which is the street on the vehicle route 202 that bus stop II is located along side.

Also, in FIG. 2, student D may traverse object route 220 to reach bus stop III. Object route 220 requires student D to cross 4th street, in order to board or disembark bus 200, wherein 4th street is the street on the vehicle route 202 that bus stop III is located along side.

Also, in FIG. 2, student E may traverse object route 222 to reach bus stop IV. Object route 222 requires student E to cross only 6th street, in order to board or disembark bus 200. 6th street is not a part of the vehicle route 202, rather the street on the vehicle route 202 that bus stop IV is located along side is 4th street.

An assignment status (for example, of being a "candidate", "assignable" or "assigned") may be automatically determined and assigned (for example by the processor) to each student for each stop with a stop boundary which includes the student's object coordinates. The assignment status may be determined and assigned by obtaining for each student an associated object cross status, a street cross status and a stop cross status.

The object cross status (for example, as a "crosser" or a "non-crosser") may be obtained based solely on attributes associated with the student, wherein the object cross status indicates if a student is allowed to cross any street including along the bus route. The street cross status (for example, of being "crossable" or "non-crossable") may be obtained based solely on attributes associated with the street. The stop cross status (for example, of being "crossable" or "non-crossable") may be obtained based solely on attributes associated with the bus stop.

The object cross status, street cross status and stop cross status are determined independently of one another. For example, if an object is designated as non-crosser, the object will not be assigned to any bus stop where the object must cross a street to embark or disembark, regardless of whether the stop or street is designated as crossable or non-crossable. Similarly, if a street is designated as non-crossable, no object will be assigned to a stop where the object must cross the street to embark or disembark, regardless of whether the object is designated as a crosser or non-crosser, or whether the stop is designated as crossable or non-crossable. Finally, if a stop is designated as non-crossable, no object that must traverse any street to reach the stop will be assigned to the stop regardless of the crosser/non-crosser status of the object or crossable/non-crossable status of the streets.

Examples of attributes that may be associated with an object in determining an object cross status would be, without limitation, a person's age and grade level. Also, a person's mental and/or physical attributes, such as height or weight, may be factors used in determining an object cross status. Further, various handicaps a person may have, such as if the person were blind, confined to a wheelchair or have a broken leg, could determinative attributes. Moreover, if the object were a type of cargo, its shape, physical size and/or shipping weight may be attributes used to determine the object cross status.

Examples of attributes that may be associated with a street in determining a street cross status would be, without limitation, the amount of traffic flow on the street, the number of lanes, the number of crossable intersections on the street, whether the street is a one-way street, or whether the street is an interstate highway. Moreover, the street cross status may vary depending on such attributes as the weather (for example, a summer day vs. a snowy day), the time of day (for example, whether it is rush hour) or whether there has been an accident on the street.

Examples of attributes that may be associated with a vehicle stop in determining a stop cross status would be, without limitation, whether there are any crossable intersections or traffic lights associated with the stop. Additionally, the number of intersecting streets at the stop, whether the street is a corner street or has traffic signs may also be determinative attributes. Moreover, the stop cross status may vary depending on such attributes as the time of day (whether it is night or the middle of the day) or whether there is a localized event (such as a parade occurring at or near that particular stop) that could influence traffic flow.

If a stop is designated as non-crossable, it may mean that an object may not cross any street to get to the stop, even if the street is not part of the bus route 202 or is not part of any object route (such as object routes 214, 216, 218, 220, 222, 224). Therefore, even if a student is designated as a crosser and a street in the student's object path is designated as crossable, the student may not be allowed to cross the crossable street to get to a stop that was designated as non-crossable. However, a user may also have the option of overriding the designation of a non-crossable stop at some later point in order to allow the student to cross the crossable street to reach the stop.

The student will be assigned an assignment status (for example, of being a candidate, assignable or "assigned") relative to the bus stop. The assignment status indicates that the student is allowed to board or disembark the vehicle at the stop, if the object cross status, the street cross status and the stop cross status do not restrict the student from crossing any streets required to board or after disembarking the vehicle at the stop.

By way of example, student A may have an initial assignment status of "candidate" by virtue of being located within the boundary 206 of bus stop I. Student A in traversing object route 214 may have an object cross status of being a "non-crosser," by virtue of being handicapped. The 2nd street, the street that bus stop I is located along side, may have a street cross status of being "crossable", by virtue of being a single lane one-way street with relatively little traffic. The bus stop I may have a stop cross status of being "crossable", by virtue of having an intersection with a crosswalk. Even though both the 2nd street and stop I have a status of "crossable", their combined status cannot override the object cross status of student A being a "non-crosser." Therefore, student A would not be allowed to cross the 2nd street in order to board the bus 200 at bus stop I. However, student A's object route 214 does not require that 2nd street be crossed. Therefore, student A's assignment status may be changed from "candidate" to "assignable" relative to bus stop I, since neither object cross status, the street cross status or the stop cross status restrict student A from crossing any streets required to board or after disembarking the vehicle at the stop. Thereafter, a processor or a user, either automatically or manually, may upgrade student A's assignment status from that of "assignable" to that of "assigned" in order to authorize bus 200 to pick up student A at bus stop I.

By way of another example, student B is a candidate for both bus stops I and IV. Student B may traverse object route 216 to reach bus stop I or traverse object route 224 to reach bus stop IV. Student B may have an object cross status of being a "crosser," by virtue of physical health, age and/or grade level.

With regards to object route 216, both 2nd street (a bus route street) and 7th street (a non-bus route street), may have a street cross status of being "crossable." The bus stop I may have a stop cross status of being "crossable." Therefore, student B's assignment status is designated as "assignable" and thereafter may be upgraded to "assigned" to bus stop I.

With regards to object route 224, 4th street (the bus route street that bus stop IV is located along side) may have a street cross status of being "crossable", by virtue of 4th street having several crossable intersections. However, the bus stop IV may have a stop cross status of being "non-crossable", by virtue of the stop IV having no crossable intersections. Therefore, student B's assignment status would be designated as "candidate" (essentially unassigned) with regards to bus stop IV, since the stop cross status restricts student B from crossing 4th street to get to bus stop IV.

By way of another example, student C is a candidate for bus stop II. Student C may traverse object route 218 to reach bus stop II. Student C may have an object cross status of being a "crosser," by virtue of physical health, age, grade level or other attributes associated with student C. However, 3rd street may have a street cross status of "non-crossable" by virtue of it being a very heavy traveled street. Additionally, bus stop II may have a stop cross status of "non-crossable", due to the lack of crossable intersections at the bus stop II. However, student C may still be designated as "assignable" and thereafter upgraded to "assigned" to bus stop II, because student C is not required to cross 3rd street or any other street to board or disembark the bus 200.

By way of another example, student D is determined to be a "candidate" for bus stop III. Student D may traverse object route 220 to reach bus stop III. Student D may have an object cross status of being a "crosser," by virtue of physical health, age, grade level or other attributes associated with student D. As mentioned earlier, $4^{th}$ street may have a street cross status of "crossable." Additionally, bus stop III may have a stop cross status of "crossable", by virtue of the bus stop III having a crossable intersection associated with it. Therefore, student D may be "assignable" and thereafter manually or automatically upgraded to "assigned" to bus stop III.

By way of another example, student E is a candidate for bus stop IV. Student E may traverse object route 222 to reach bus stop IV. Student E may have an object cross status of being a "crosser," by virtue of physical health, age, grade level or other attributes associated with student E. As mentioned earlier, 4th street may have a street cross status of "crossable", but bus stop IV may have a stop cross status of "non-crossable", by virtue of there being no crossable intersections associated with the stop IV. Student E only has to cross 6th street (a street that is not a part of bus route 202), which may have a street cross status designated as "crossable." However, even though student E is a "crosser" and 6th street is crossable, student E is not assignable to bus stop IV by virtue of it having a stop cross status of "non-crossing." Accordingly, student E may not be "assigned" to bus stop IV and must retain the designation of "candidate".

Table I below summarizes the previous examples of determining assignment statuses for students A through E. As can be seen, a student is assigned an assignment status of "candidate", "assignable" or "assigned" relative to a particular bus stop based on attributes of the student, the streets and the bus stop. A student may be "assigned" to a bus stop if the object cross status, the street cross status and the stop cross status each do not restrict the student from crossing any streets required to board or after disembarking the bus at the bus stop.

TABLE I

Determination of Assignment status

| Student and Object Route | Required to Cross a Street or Not | Object Cross Status | Street Cross Status (Bus Route Street) | Street Cross Status (Non-Bus Route Street) | Stop Cross Status | Assignment status |
|---|---|---|---|---|---|---|
| A: (Object Route 214) | Not required to cross any streets. | Non-Crosser | 2nd Street: Crossable | No non-bus route streets | Bus Stop I: Crossable | Assignable and Assigned, because A does not cross any streets. |
| B: (Object Route 216) | Required to cross 2nd and 7th streets. | Crosser | 2nd Street: Crossable | 7th Street: Crossable | Bus Stop I: Crossable | Assignable and Assigned, because all streets and stops are crossable, and B is a crosser. |
| B: (Object Route 224) | Required to cross 4th street. | Crosser | 4th Street: Crossable | No non-bus route streets. | Bus Stop IV: Non-Crossable | Remains an unassigned candidate, because the bus stop IV is non-crossable. |
| C: (Object Route 218) | Not required to cross any streets. | Crosser | 3rd Street: Non-Crossable | No non-bus route streets. | Bus Stop II: Non-Crossable | Assignable and Assigned, because C does not cross any streets. |
| D: (Object Route 220) | Required to cross 4th street. | Crosser | 4th Street: Crossable | No non-bus route streets. | Bus Stop III: Crossable | Assignable and Assigned, because all streets and stops are crossable, and D is a crosser. |
| E: (Object Route 222) | Required to cross 6th street only. | Crosser | 4th Street: Crossable | 6th Street: Crossable | Bus Stop IV: Non-Crossable | Remains an unassigned candidate, because bus stop IV is non-crossable. |

Figure 3:
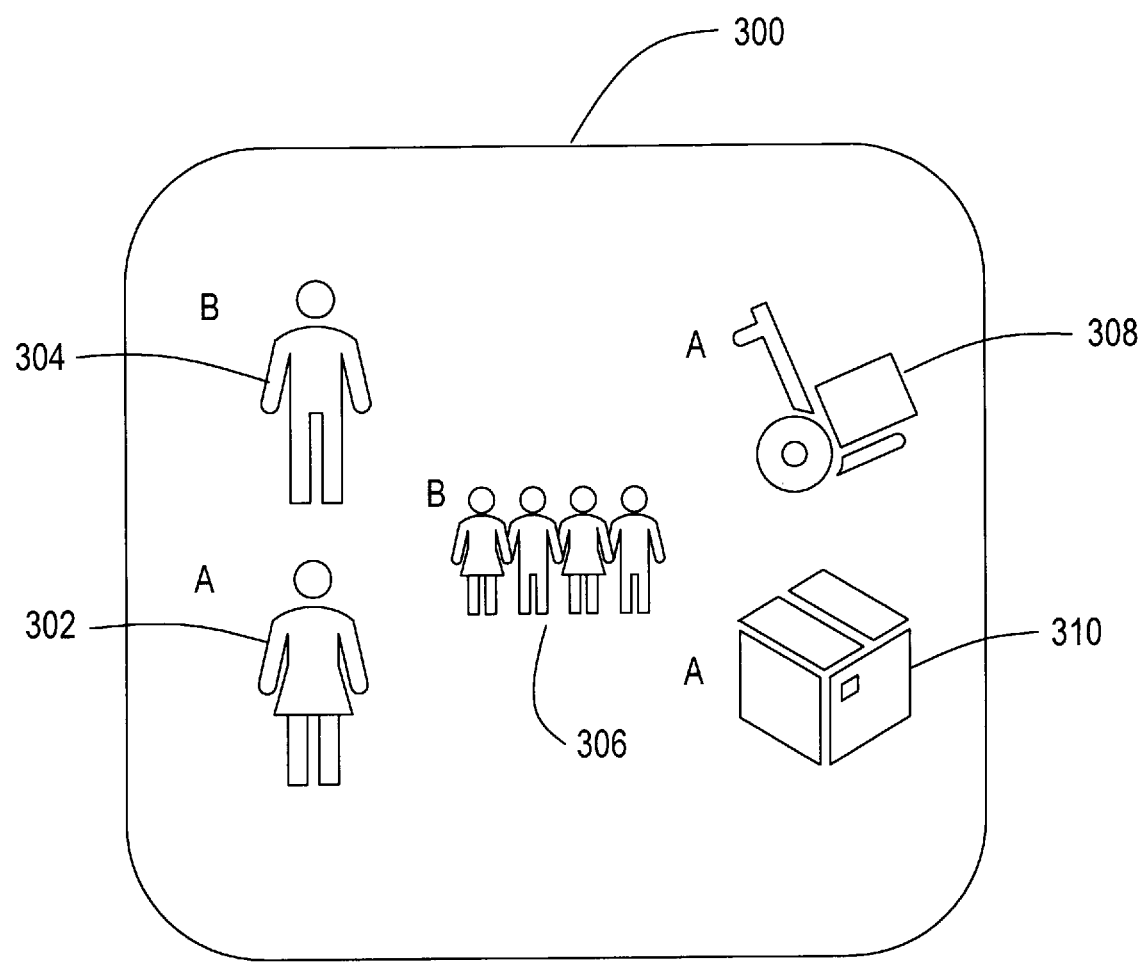
FIG. 3 depicts an example of visual indications that may be displayed on a user interface of which objects are allowed to board or disembark, and which objects are restricted from boarding or disembarking, a vehicle, in accordance with aspects described herein.

Referring to FIG. 3, an example of visual indications that may be displayed on a user interface 300 of which objects are allowed to board or disembark, and which objects are restricted from boarding or disembarking, a vehicle is depicted, in accordance with aspects described herein. Though the examples illustrated in FIG. 2 show students (A, B, C, D, E) boarding or disembarking a bus 200, methods in accordance with the present invention may be applied to objects other than students and to vehicles other than busses. For example, the methods may be applied to such objects as: women 302, men 304, children 306, cargo or packages 308 requiring mechanical lifts, cargo or packages 310 that can be lifted by hand or the like. Additionally, the vehicle may be a pick-up truck, a train, other forms of public transportation or the like.

The user interface 300 may also provide a visual indicator of the assignment status of each object 302, 304, 306, 308, 310 that could potentially be assigned to a stop (e.g., candidates) whether or not boarding or disembarking the vehicle at the stop is allowed. For example, the user interface 300 may color code objects 304 and 306 as being "assigned" to a stop and color code objects 302, 308 and 310 as being "unassigned" to that same stop.

Figure 4:
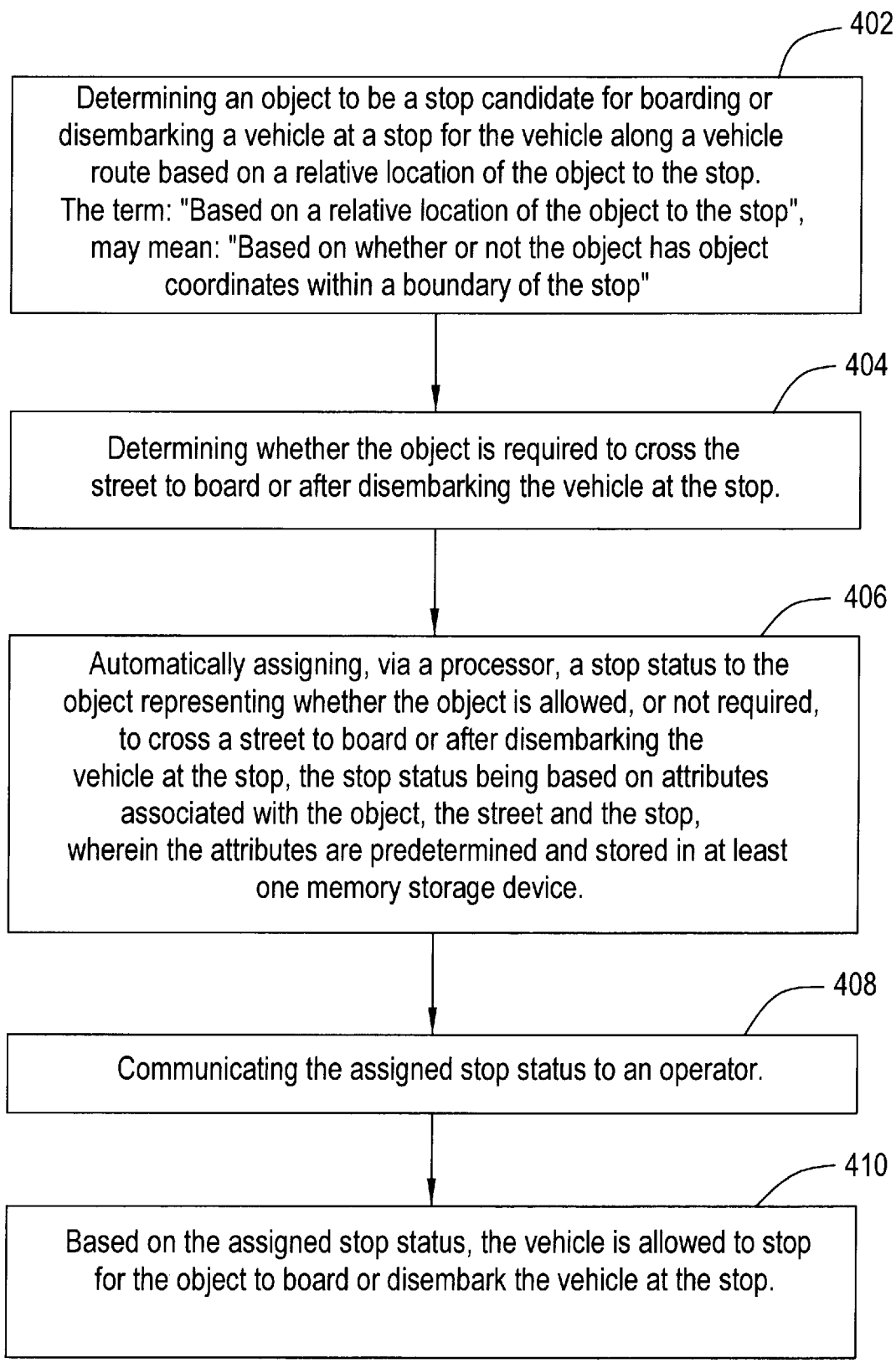
FIG. 4 depicts an example of a flow diagram of a method of determining if an object is allowed to board or disembark a vehicle at a vehicle stop, in accordance with aspects described herein.

Referring to FIG. 4, an example of a flow diagram of a method of determining if an object is allowed to board or disembark a vehicle at a vehicle stop is depicted, in accordance with aspects described herein. The method begins at 402, wherein an object (such as a student) is determined to be a candidate for boarding or disembarking a vehicle at a stop for the vehicle along a vehicle route based on a relative location of the object to the stop. In this context, the term: "based on a relative location of the object to the stop", may mean: "based on whether or not the object has object coordinates within a boundary of the stop." Thereafter, at 404, it is determined whether the object is required to cross the street to board or after disembarking the vehicle at the stop. These steps may occur automatically via a processor.

At 406, an assignment status is automatically assigned, via a processor, to the object. The assignment status represents whether the object is allowed, or not required, to cross a street to board or after disembarking the vehicle at the stop. The assignment status may be designated as: "candidate", "assignable" or "assigned." The assignment status is based on attributes associated with the object, the street and the stop. The attributes are predetermined and stored in at least one memory storage device associated with the processor.

At 408, the assigned assignment status is communicated to an operator. Thereafter, at 410, the vehicle, based on the assigned assignment status, is allowed to stop for the object to board or disembark the vehicle at the stop.

Figure 5:
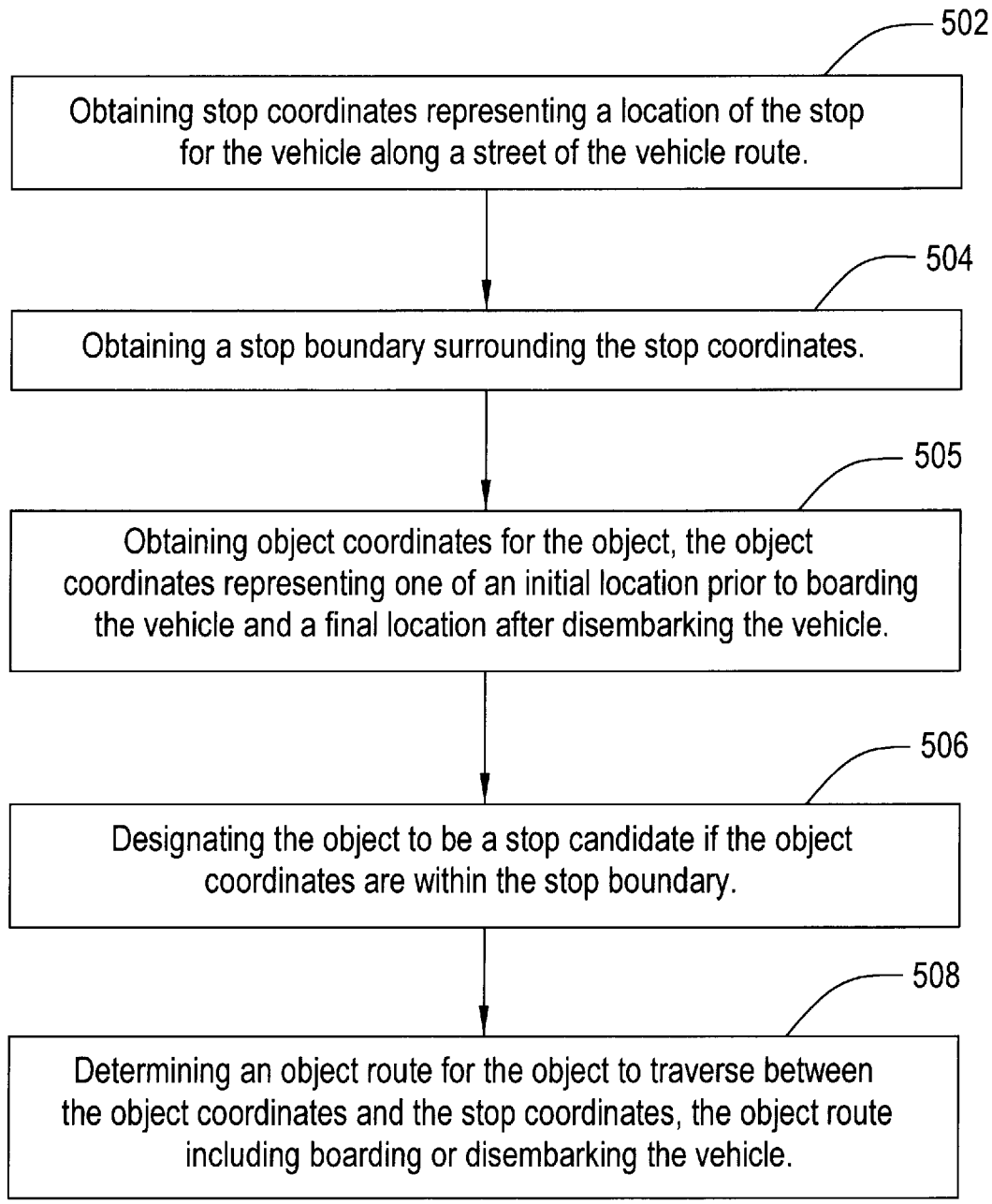
FIG. 5 depicts an example of a flow diagram of a method of determining an object to be a candidate for a stop, in accordance with aspects described herein.

Referring to FIG. 5 an example of a flow diagram of a method of determining an object to be a candidate is depicted, in accordance with aspects described. This method supplements the method described in FIG. 4, as one example of determining whether an object (such as a student) is a candidate.

The method begins as 502, wherein stop coordinates are obtained, which represent a location of a stop for a vehicle along a street of the vehicle route. At 504, a stop boundary is obtained, wherein the stop boundary surrounds the stop coordinates. These steps may occur automatically via a processor.

Additionally, at 505, object coordinates are obtained for the object. The object coordinates may represent either an initial location (such as a student's home address) prior to boarding the vehicle (such as a bus) or a final location after disembarking the vehicle. At 506, the object is designated to be a candidate if the object coordinates are within the stop boundary. These steps may also be performed automatically via a processor.

At 508, once the object is designated a candidate, an object route is determined for the object to traverse between the object coordinates and the stop coordinates. The object route additionally includes boarding or disembarking the vehicle. This step may be performed automatically via a processor.

Figure 6:
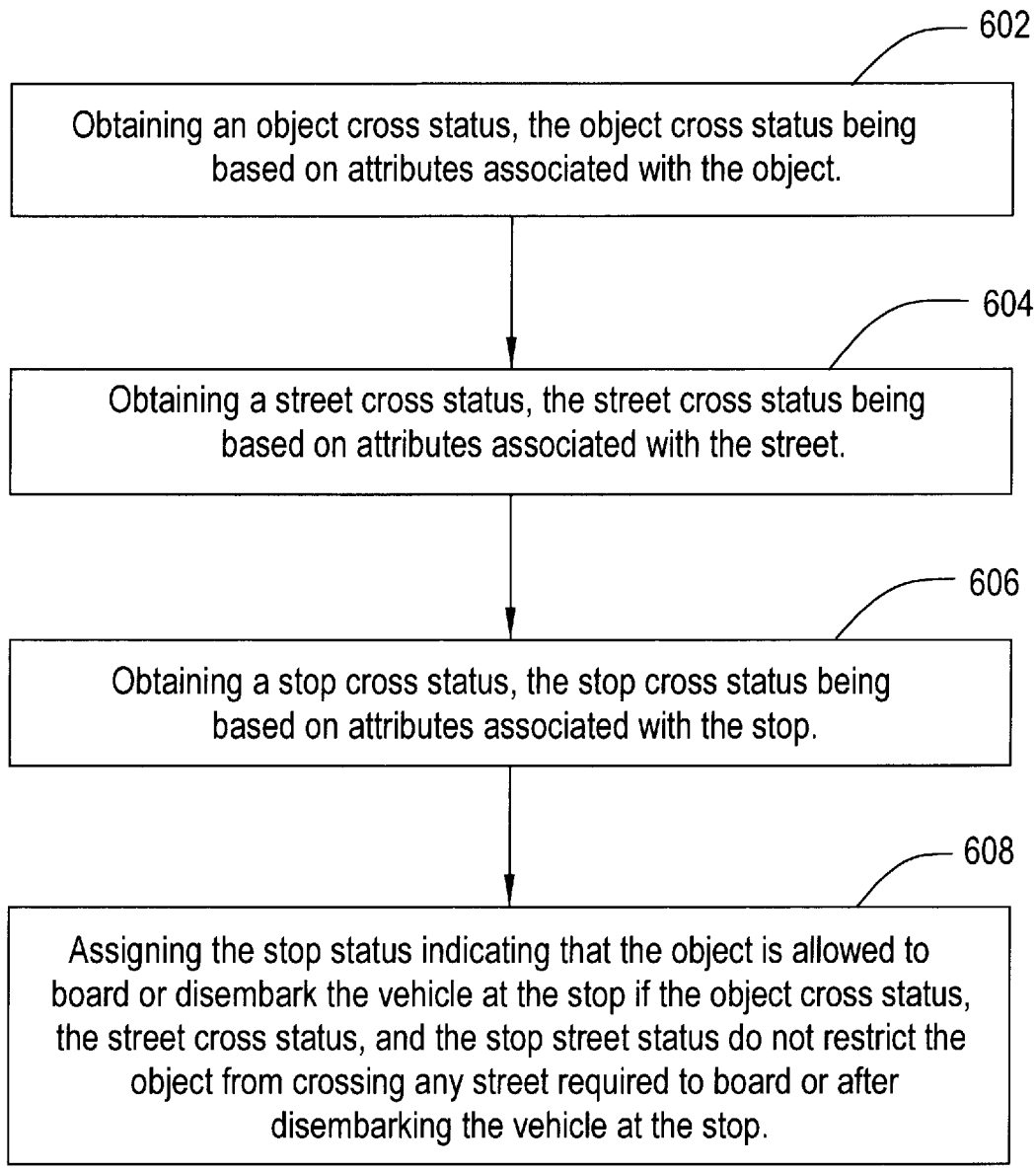
FIG. 6 depicts an example of a flow diagram of a method of assigning an assignment status to an object, in accordance with aspects described herein.

Referring to FIG. 6, an example of a flow diagram of a method of assigning an assignment status to an object is depicted, in accordance with aspects described herein. This method supplements the method described in FIGS. 4 and 5, as one example of determining whether an object (such as a student) is assigned an assignment status of being "assigned" to a vehicle (such as a bus) stop. The method begins at 602, wherein an object cross status is obtained, the object cross status being based on attributes associated with the object. The object cross status may indicate if the object is allowed to cross any street.

At 604, a street cross status is obtained, the street cross status being based on attributes associated with a street. The street cross status may indicate if objects are allowed to cross the street based upon attributes of the street.

Additionally, at 606, a stop cross status is obtained, the stop cross status being based on attributes associated with the stop. The stop cross status may indicate if any objects are allowed to cross any streets based upon attributes of the stop.

At 608, an assignment status is assigned to the object relative to the potential vehicle stop. The assignment status indicates that the object is allowed to board or disembark the vehicle at the stop if the object cross status, the street cross status and the stop cross status do not restrict the object from crossing any streets required to board or after disembarking the vehicle at the stop.

It is possible that multiple objects may be candidates for the same vehicle stop to board or disembark the vehicle. In one aspect of the invention, one candidate may be assigned (either manually or automatically) to the stop (according to the attributes of the first object, street and stop) while the other candidate is not assigned to the stop (according to the attributes of the second object, street and stop). In such a situation, the vehicle may be allowed to stop at the vehicle stop to allow the first object to embark or disembark the vehicle, but not allow the second object to embark or disembark the vehicle. In such a situation, notifications to users may be sent to inform them that the first object will be allowed to embark and/or disembark the vehicle at the stop and to inform that the second object will not be allowed to embark or disembark at the stop. And in such a situation, the second object may be allowed to embark or disembark the vehicle at another stop where the second object is assigned. And, users may be so notified of such assignment and that the second object will embark or disembark at another stop. Any notifications related to assignments of objects to stops may be done automatically, if desired, via a processor and stored in a memory or device.

Figure 7:
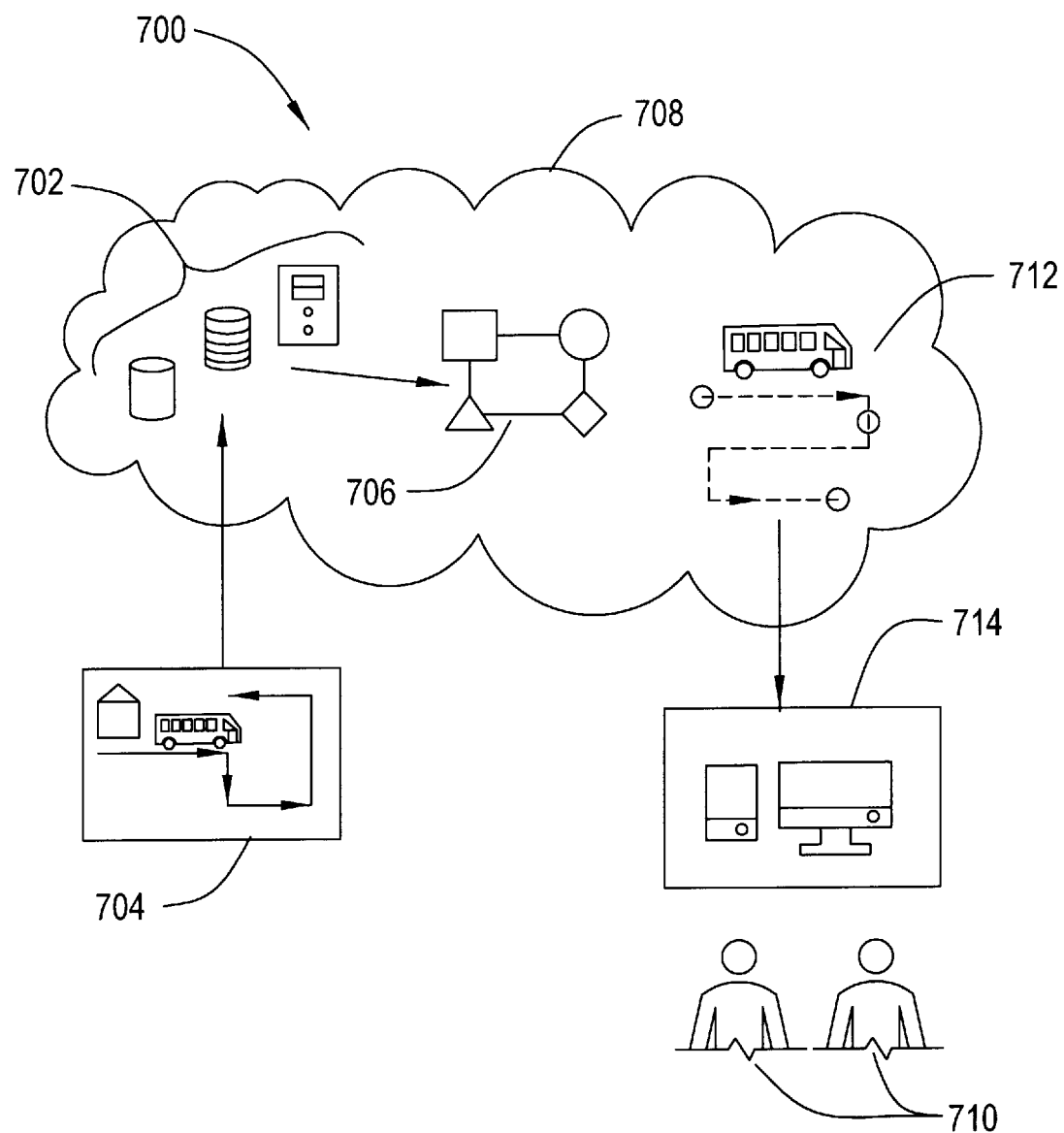
FIG. 7 depicts an example of a schematic representation of a system in accordance with aspects described herein.

Referring to FIGS. 7 and 8, aspects of a system 700 in accordance with an exemplary embodiment for determining if objects (such as students) are allowed to board or disembark a vehicle (such as a bus) at a vehicle stop is shown. The system 700 may include one or more processors or servers 702 where data (or information) 704 is transferred and processes, including specific algorithms 706, are performed. In one example, the system 700 may be implemented via cloud computing 708. The system 700 receives or obtains information 704, which may represent an electronic map of an area that includes a vehicle route for a bus. The information 704 may also include each street on the map and/or other streets including streets the bus may potentially traverse and coordinates for each potential stop that the bus may stop at. The information 704 may also include the coordinates of initial and/or final destinations of each student that may potentially board or disembark from the bus. The information 704 may also include input data on various attributes associated with the students, the streets and the stops. The information 704 may be obtained by any viable method including receiving such information from a computer or mobile device or generating the same from GPS data that has been stored in one or more storage devices. The information may also be input by one or more users 710. Other techniques for obtaining information may also be used to create, generate, and/or obtain the same. Within the system 700 and memory associated therewith, the information 704 may be stored in any desirable format.

A process or algorithm 706 performed by the processor 702 may use the information 704 to generate results 712. The results 712 may electronically represent and/or create a bus route with stop boundaries surrounding the stops to determine which students are candidates for each bus stop on the bus route. The results 712 may also include a determination of an object cross status for each student, a street cross status for each street and a stop cross status for each stop. The results 712 may also include an assigned assignment status to each student, which indicates which stops a student is allowed to board or disembark the bus. The system 700 may also store the results 712 for later use or analysis.

Users (or operators) 710 may be enabled to view the results 712 on any number of user interfaces 714. The users 710 may also be allowed to input further information 704 through the user interfaces 714, to perform such tasks as modifying the process or algorithm 706 in order to edit or further analyze the results 712.

Figure 9:
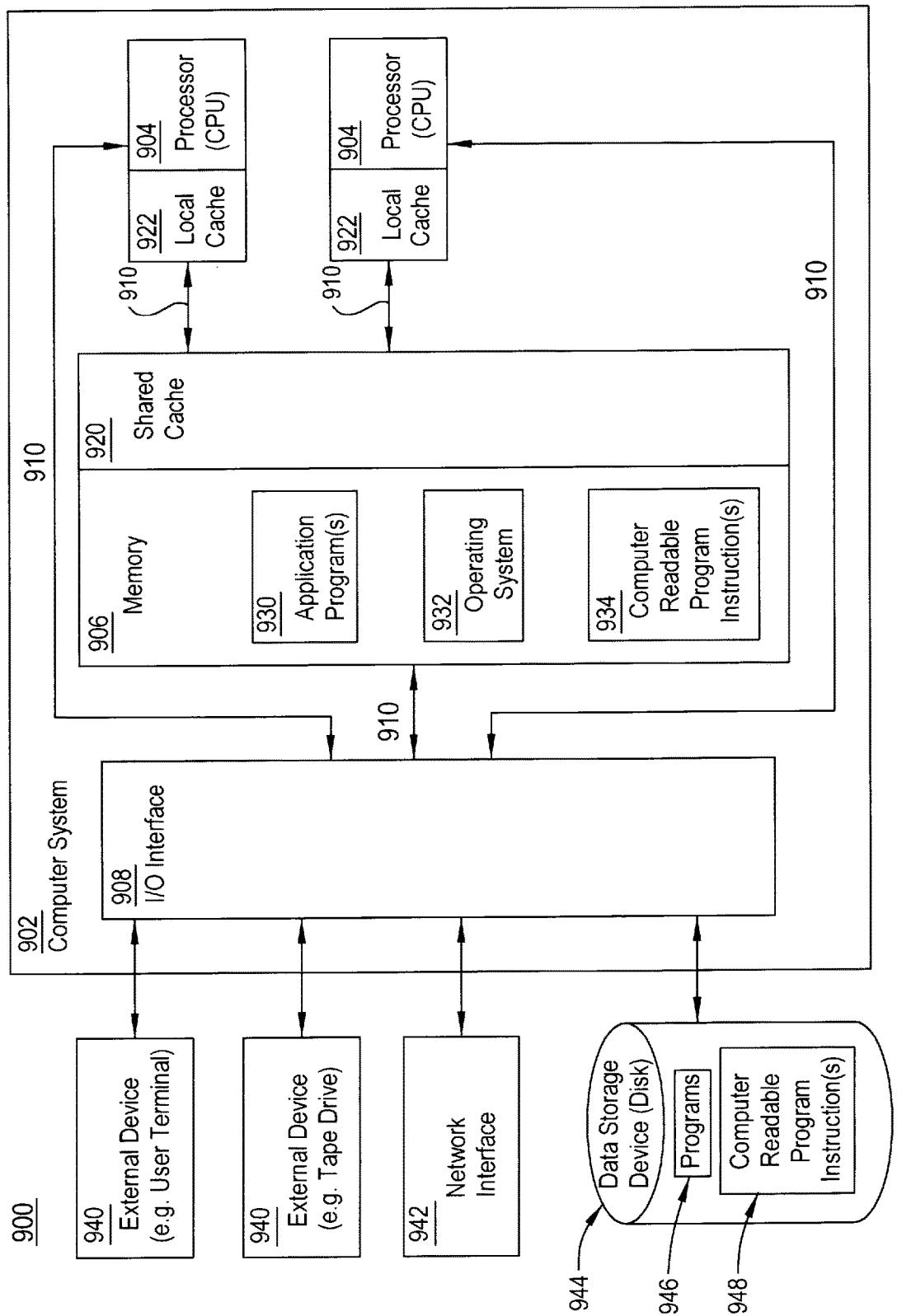
FIG. 9 depicts an example of a computing environment which may be used to incorporate and perform one or more aspects of a method of determining if an object is allowed to board or disembark a vehicle at a vehicle stop, in accordance with aspects described herein.

As shown in FIG. 9, a computing environment 900 useable to perform the process of this invention is disclosed. The computing environment includes, for instance, a computer system 902 shown, e.g., in the form of a general-purpose computing device. Computer system 902 may include, but is not limited to, one or more processors or processing units 904 (e.g., central processing units (CPUs)), a memory 906 (a.k.a., system memory, main memory, main storage, central storage or storage, as examples), and one or more input/output (I/O) interfaces 908, coupled to one another via one or more buses and/or other connections 910.

Bus 910 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 906 may include, for instance, a cache 920, such as a shared cache, which may be coupled to local caches 922 of processors 904. Further, memory 906 may include one or more programs or applications 930, an operating system 932, and one or more computer readable program instructions 934. Computer readable program instructions 934 may be configured to carry out functions of embodiments of aspects of the invention.

Computer system 902 may also communicate via, e.g., I/O interfaces 908 with one or more external devices 940, one or more network interfaces 942, and/or one or more data storage devices 944. Example external devices include a user terminal, a tape drive, a pointing device, a display, etc. Network interface 942 enables computer system 902 to communicate with one or more networks, such as a local area network (LAN), a general wide area network (WAN), and/or a public network (e.g., the Internet), providing communication with other computer devices or systems. For example, the system may be connected to a personal computer, tablet device or smart phone to communicate the assigned or unassigned status of mobile objects to user via a graphical user interface.

Data storage device 944 may store one or more programs 946, one or more computer readable program instructions 948, and/or data, etc. The computer readable program instructions may be configured to carry out functions of embodiments of aspects of the invention.

Computer system 902 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 902. Examples, include, but are not limited to: microcode, device drivers, redundant processing units, external disk drive arrays, RAID systems, tape drives, and data archival storage systems, etc.

Computer system 902 may be operational with numerous other general purposes or special purpose computing system environments or configurations. Examples of well-known computing systems, environments, and/or configurations that may be suitable for use with computer system 902 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

One or more of the processors and/or other aspects of the computer system or computing environment may be remote from the mobile object. Further, in one particular example, a processor, such as processor 904, may execute, in accordance with one or more aspects of the present invention, one or more machine learning engines and/or other engines to provide, based on training and learning, an optimal travel route or path for mobile object. These engines may be stored in memory, including main memory and/or one or more caches, and/or external storage, and may be executed on one or more processors. Many variations exist.

One or more aspects of the present invention are inextricably tied to computer technology and/or to the improvement of a technical field.

One or more aspects may relate to cloud computing. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages such as Angular, HTML, CSS, .NET Framework, C # and Microsoft SQL Server, and including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, different types of unmanned aerial vehicles may be used, as well as other types of neural networks and/or evolutionary algorithms. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

It should be appreciated that all combinations of the foregoing concepts and additional concepts discussed in greater detail herein (provided such concepts are not mutually inconsistent) are contemplated as being part of the inventive subject matter disclosed herein and to achieve the benefits and advantages as described herein. In particular, all combinations of claimed subject matter appearing at the end of this disclosure are contemplated as being part of the inventive subject matter disclosed herein.

Although the invention has been described by reference to specific examples, it should be understood that numerous changes may be made within the spirit and scope of the inventive concepts described. Accordingly, it is intended that the disclosure not be limited to the described examples, but that it has the full scope defined by the language of the following claims.

What is claimed is:

1. A method of determining if an object is allowed to board or disembark a vehicle at a vehicle stop, the method comprising:

determining an object to be a candidate for boarding or disembarking a vehicle at a stop for the vehicle along a vehicle route based on a relative location of the object to the stop;

automatically assigning, via a processor, an assignment status to the object representing whether the object is allowed to board or disembark the vehicle at the stop, the assignment status being based on attributes associated with the object, a street and the stop, wherein the attributes are predetermined and stored in at least one memory storage device;

communicating the assigned assignment status to an operator;

wherein based on the assigned assignment status, the vehicle is designated to stop for the object to board or disembark the vehicle at the stop;

wherein automatically assigning the assignment status to the object comprises:

obtaining an object cross status, the object cross status being based on attributes associated with the object;

obtaining a street cross status, the street cross status being based on attributes associated with the street;

obtaining a stop cross status, the stop cross status being based on attributes associated with the stop; and the assigned assignment status indicating that the object is allowed to board or disembark the vehicle at the stop if the object cross status, the street cross status and the stop cross status do not restrict the object from crossing any streets required to board or after disembarking the vehicle at the stop.

2. The method of claim 1 comprising determining whether the object is required to cross the street to board or after disembarking the vehicle at the stop prior to assigning an assignment status to the object.

3. The method of claim 1 comprising:

obtaining stop coordinates representing a location of the stop for the vehicle along a street of the vehicle route;

obtaining a stop boundary surrounding the stop coordinates;

obtaining object coordinates for the object, the object coordinates representing one of an initial location prior to boarding the vehicle and a final location after disembarking the vehicle; and designating the object to be a candidate if the object coordinates are within the stop boundary.

4. The method of claim 3, comprising:

determining an object route for the object to traverse between the object coordinates and the stop coordinates, the object route including boarding or disembarking the vehicle; and wherein the street comprises a street on the object route.

5. The method of claim 4, wherein the street comprises a street on the vehicle route.

6. The method of claim 4, wherein the street comprises a plurality of streets on the object route.

7. The method of claim 4, wherein the object route comprises a plurality of object routes between the object coordinates and the stop coordinates.

8. The method of claim 3, comprising enabling the operator to adjust the stop boundary via a user interface.

9. The method of claim 8, comprising providing a visual indicator on the user interface of each object that could potentially be assigned to a stop whether or not boarding or disembarking the vehicle at the stop is allowed.

10. A computer system for determining if an object is allowed to board or disembark a vehicle at a vehicle stop, the computer system comprising:

a memory; and a processor in communication with the memory, wherein the computer system is configured to perform a method, the method comprising:

determining an object to be a candidate for boarding or disembarking a vehicle at a stop for the vehicle along a vehicle route based on a relative location of the object to the stop;

automatically assigning, via a processor, an assignment status to the object representing whether the object is allowed to board or disembark the vehicle at the stop, the assignment status being based on attributes associated with the object, a street and the stop, wherein the attributes are predetermined and stored in at least one memory storage device;

communicating the assigned assignment status to an operator;

wherein the vehicle is allowed to stop for the object to board or disembark the vehicle at the stop based on the assigned assignment status;

wherein automatically assigning the assignment status to the object comprises:

obtaining an object cross status, the object cross status being based on attributes associated with the object;

obtaining a street cross status, the street cross status being based on attributes associated with the street;

obtaining a stop cross status, the stop cross status being based on attributes associated with the stop; and the assigned assignment status indicating that the object is allowed to board or disembark the vehicle at the stop if the object cross status, the street cross status and the stop cross status do not restrict the object from crossing any streets required to board or after disembarking the vehicle at the stop.

11. The computer system of claim 10 comprising determining whether the object is required to cross the street to board or after disembarking the vehicle at the stop prior to assigning an assignment status to the object.

12. The computer system of claim 10 wherein the method comprises:

obtaining stop coordinates representing a location of the stop for the vehicle along a street of the vehicle route;

obtaining a stop boundary surrounding the stop coordinates;

obtaining object coordinates for the object, the object coordinates representing one of an initial location prior to boarding the vehicle and a final location after disembarking the vehicle; and designating the object to be a candidate if the object coordinates are within the stop boundary.

13. The computer system of claim 12, wherein the method comprises:

determining an object route for the object to traverse between the object coordinates and the stop coordinates, the object route including boarding or disembarking the vehicle; and wherein the street comprises a street on the object route.

14. The computer system of claim 13, wherein the street comprises a plurality of streets on the object route.

15. The computer system of claim 12, comprising enabling the operator to adjust the stop boundary via a user interface.

16. A computer program product for determining if an object is allowed to board or disembark a vehicle at a vehicle stop, the computer program product comprising:

at least one non-transitory computer readable storage medium readable by a processing circuit and storage instructions for performing a method comprising:

determining an object to be a candidate for boarding or disembarking a vehicle at a stop for the vehicle along a vehicle route based on a relative location of the object to the stop;

automatically assigning, via a processor, an assignment status to the object representing whether the object is allowed to board or disembark the vehicle at the stop, the assignment status being based on attributes associated with the object, the street and the stop, wherein the attributes are predetermined and stored in at least one memory storage device;

communicating the assigned assignment status to an operator wherein the vehicle can be manually or automatically allowed to stop for the object to board or disembark the vehicle at the stop based on the assigned assignment status;

wherein automatically assigning the assignment status to the object comprises:

obtaining an object cross status, the object cross status being based on attributes associated with the object;

obtaining a street cross status, the street cross status being based on attributes associated with the street;

obtaining a stop cross status, the stop cross status being based on attributes associated with the stop; and the assigned assignment status indicating that the object is allowed to board or disembark the vehicle at the stop if the object cross status, the street cross status and the stop cross status do not restrict the object from crossing any streets required to board or after disembarking the vehicle at the stop.

17. The computer program product of claim 16 comprising determining whether the object is required to cross the street to board or after disembarking the vehicle at the stop prior to assigning an assignment status to the object.

18. The computer program product of claim 16 wherein the method comprises:

obtaining stop coordinates representing a location of the stop for the vehicle along a street of the vehicle route;

obtaining a stop boundary surrounding the stop coordinates;

obtaining object coordinates for the object, the object coordinates representing one of an initial location prior to boarding the vehicle and a final location after disembarking the vehicle; and designating the object to be a candidate if the object coordinates are within the stop boundary.

19. The computer program product of claim 18, wherein the method comprises:

determining an object route for the object to traverse between the object coordinates and the stop coordinates, the object route including boarding or disembarking the vehicle; and wherein the street comprises a street on the object route.

20. The computer program product of claim 19, wherein the street comprises a plurality of streets on the object route.

* * * * *